United States Patent Office 3,284,460
Patented Nov. 8, 1966

3,284,460
PYRIDYLTHIOLCARBAMATES AND PROCESS FOR THEIR PRODUCTION
Godfrey Wilbert, Carmel, and Henry Wetstein, Monroe, N.Y., assignors to Nepera Chemical Co., Inc.
No Drawing. Filed Dec. 4, 1964, Ser. No. 416,109
6 Claims. (Cl. 260—294.8)

This invention relates to novel pyridylthiolcarbamates of the formula:

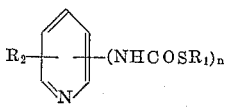

wherein $R_1$ represents lower alkyl such as methyl, ethyl, propyl, butyl, isobutyl and the like; lower alkenyl such as vinyl, allyl and the like; phenyl or substituted phenyl such as p-chlorophenyl, 3,4-dichlorophenyl, m-methylphenyl, o-bromophenyl, p-ethylphenyl, p-fluorophenyl, p-methoxyphenyl, o-methoxyphenyl, m-butoxyphenyl, p-nitrophenyl, 3,4-dinitrophenyl, 2,4-dinitrophenyl, o-nitrophenyl or heterocyclic such as pyrimidyl, pyridyl, indazolyl, quinolyl, isoquinolyl, dibenzofuryl and furyl; and $R_2$ represents hydrogen or lower alkyl such as methyl, ethyl, propyl, butyl, isobutyl and the like; and $n$ is an integer of from 1 to 2.

This invention also includes within its scope new and novel methods of preparing these compounds.

The compounds of this invention are useful as herbicides, pesticides and as chemicals useful in agricultural chemistry. In addition, they are useful as starting materials for the production of other chemicals useful for herbicides or pesticides.

According to the process of this invention, these novel compounds are prepared by treating the corresponding aminopyridine or aminoalkylpyridine with the appropriate substituted alkyl or aryl chlorothiolformates, at a temperature of from 0 to 5° C. in a suitable solvent system such as a mixture of ether-pyridine or ether alone. The solvent is then removed from the reaction product by distillation and the product is recovered by filtration.

An alternate process for the production of these compounds may be effected by refluxing sodamide and the aminopyridine or aminoalkyl pyridine together in the selected solvent system and adding the alkyl or aryl chlorothiolformate to the hot reaction mixture. The reaction is recovered by filtration techniques.

In order further to illustrate the present invention, the following examples are given:

EXAMPLE 1

S-methyl-N-(2-pyridyl)-thiolcarbamate
(Methyl-(2-pyridyl)-thiolcarbamate)

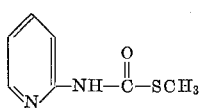

$C_7H_8N_2OS$  M.W. 168.22

9.4 g. of 2-aminopyridine (0.1 mole) are dissolved in a solution of 100 ml. ether and 7.9 g. pyridine. The reaction mixture is cooled to between 0° and 5° C. and at this temperature methyl chlorothiolformate is added dropwise. The reaction mixture is maintained an additional 30 minutes at 0°–5° C., then allowed to warm up slowly to 20 to 30° C. The ether is distilled off at reduced pressure and the residue added to 150 ml. ice cold water. The product is separated by filtration, washed with ice cold water and recrystallized from ethanol to yield S-methyl-N-(2-pyridyl) - thiolcarbamate as a white solid, M.P. 113.5–114° C.

The IR spectrum features a band at $6.0\mu$ for carbonyl absorption.

EXAMPLE 2

S-ethyl-N-(2-pyridyl)-thiolcarbamate
(Ethyl-(2-pyridyl)-thiolcarbamate)

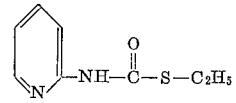

$C_8H_{10}N_2OS$  M.W. 182.22

9.4 g. of 2-aminopyridine are dissolved in a solution of 150 ml. ether and 7.9 g. pyridine and cooled to 0–5° C. To this solution is added ethyl chlorothiolformate, dropwise, with stirring at a temperature of 10° C. or below. After the addition is completed, the reaction mixture is stirred an additional 30 minutes and allowed to warm slowly to 20 to 30° C. The ether is removed by distillation and the residue added to ice water and the product is separated by filtration. The waxy solids are crystallized from hexane to yield S-ethyl-N-(2-pyridyl)-thiolcarbamate as a white product, M.P. 69–71° C.

The IR spectrum features a band at $6.0\mu$ for carbonyl absorption.

EXAMPLE 3

S-methyl-N-(3-pyridyl)-thiolcarbamate
(Methyl-(3-pyridyl)-thiolcarbamate)

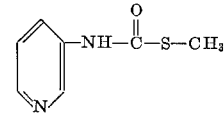

$C_7H_8N_2OS$  M.W. 168.22

9.4 g. of 3-aminopyridine are dissolved in a solution of 100 ml. of ether and 7.9 g. of pyridine. The reaction mixture is cooled to between 0° and 5° C., and at this temperature 11.5 g. of methyl chlorothiolformate are added dropwise. The reaction mixture is maintained an additional 30 minutes at 0–5° C., then allowed to slowly warm up to 20 to 30° C. The ether is distilled off at reduced pressure and the residue added to 150 ml. ice cold water. The product is separated by filtration, washed with ice cold water and recrystallized from ethanol to yield S-methyl-N-(3-pyridyl)-thiolcarbamate as a white solid, M.P. 150–151° C.

EXAMPLE 4

S-phenyl-N-(2-pyridyl)-thiolcarbamate
(Phenyl-(2-pyridyl)-thiolcarbamate)

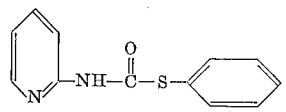

$C_{12}H_{10}N_2OS$  M.W. 230.16

9.4 g. of 2-aminopyridine is dissolved in 30 ml. of pyridine and cooled to +2° C. 17.25 g. of phenylchlorothiolformate is added over one-half hour dropwise, with stirring at a reaction temperature of 2 to 5° C. After the addition is completed, the reaction mixture is stirred an additional 30 minutes and allowed to warm slowly to room temperature, adding 100 ml. of ice water, gives S-phenyl-N-(2-pyridyl)-thiolcarbamate as a while crystalline product having an M.P. of 138°–140° C.

The IR spectrum features a band at $6.0\mu$ for carbonyl absorption.

EXAMPLE 5

*S,S'-dimethyl-N,N'-2,6-pyridyldithiolcarbamate*

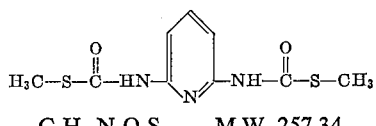

$C_9H_{11}N_3O_2S_2$    M.W. 257.34

10.9 g. of 2,6-diaminopyridine are dissolved in 60 ml. of pyridine and cooled to about 0° C. 24.3 g. of methyl chlorothiolformate are added over one-half hour, dropwise, with stirring at a temperature of 0° to 5° C. After the addition is completed 150 ml. of ether is added and the reaction mixture is stirred for 30 minutes at 5° to 10° C. The solid product is separated and stirred with ice water for thirty minutes to give S,S'-dimethyl-N,N'-2,6-pyridyldithiolcarbamate as a yellow solid. The product is collected by filtration, M.P. 118°–120° C.

It is to be understood that the foregoing detailed description is given merely by way of illustration and that many variations may be made therein without departing from the spirit of our invention.

Having described our invention, what we desire to secure by Letters Patent is:

1. A compound of the formula:

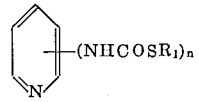

wherein the position para to the nitrogen is unsubstituted and $R_1$ is lower alkyl or phenyl and $n$ is 1 or 2.

2. S-methyl-N-(2-pyridyl)-thiolcarbamate.
3. S-ethyl-N-(2-pyridyl)-thiolcarbamate.
4. S-methyl-N-(3-pyridyl)-thiolcarbamate.
5. S-phenyl-N-(2-pyridyl)-thiolcarbamate.
6. S,S'-dimethyl-N,N'-2,6-pyridyldithiolcarbamate.

References Cited by the Examiner

Chem. Abstracts, volume 60, par. 7969 (1964).

WALTER A. MODANCE, *Primary Examiner.*

ALAN L. ROTMAN, *Assistant Examiner.*